June 11, 1935.　　　　　　　J. RAH　　　　　　　2,004,392
HIGH POTENTIAL OR CURRENT INDICATOR
Filed Feb. 17, 1930
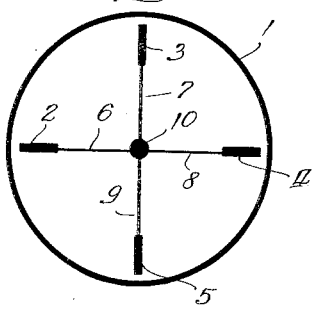
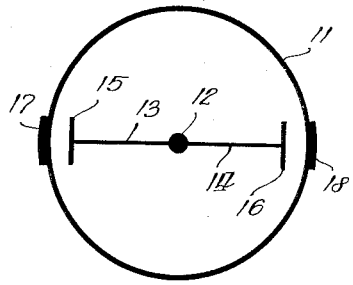
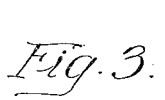
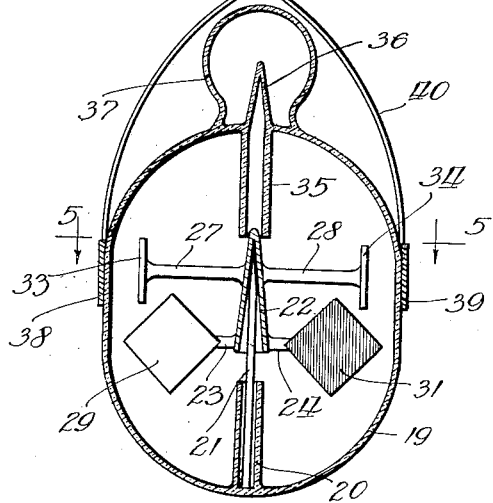
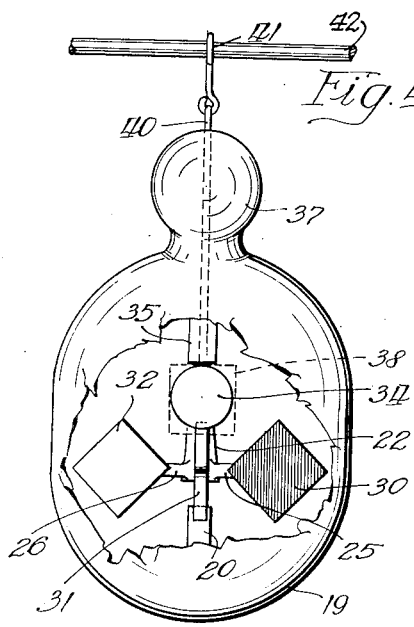
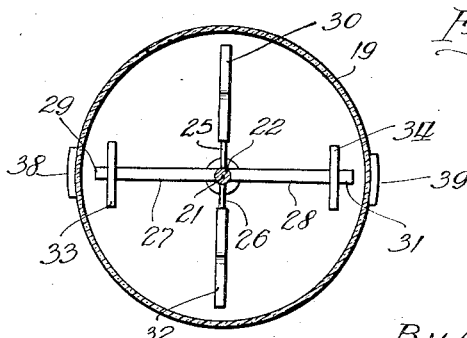
Inventor:
Joseph Rah.

Patented June 11, 1935

2,004,392

UNITED STATES PATENT OFFICE 2,004,392

HIGH POTENTIAL OR CURRENT INDICATOR

Joseph Rah, Chicago, Ill., assignor to The Delta Star Electric Company, Chicago, Ill., a corporation of Illinois Application February 17, 1930, Serial No. 428,994

5 Claims. (Cl. 177—311)

The invention disclosed in this specification relates to indicating devices in general, but is specifically concerned with a novel type of instrument for indicating the energized or non-energized condition of current conductors in a more positive and more dependable manner than was hitherto the case, by utilizing principles not applied in prior devices of this type.

Indicating devices of various kinds are widely used by workmen to determine whether a conductor is "dead" and therefore safe to touch. This is especially so in the case of men working on power distributing systems employing high voltages. Devices of this class, as known to the prior art, have been more or less unsatisfactory and inherently dangerous. These prior devices have given a positive or active response to indicate an energized and therefore unsafe conductor; and they have given a negative response (no response) to indicate a non-energized and therefore safe conductor. When such devices are out of order, they give no response whatever and therefore indicate a safe condition at all times. This obviously exposes the workmen to extreme danger should they relay on the indications of the defective instrument.

The primary aim of my invention is, accordingly, to furnish an instrument which combines the principles intimated above, and renders positive visual indication of the non-energized condition of a current conductor (when the instrument is in working order) while rendering negative visual indication either when the tested circuit is energized or when the instrument used for testing is out of order.

It is a further object of my present invention to provide an indicating instrument of the above class which will furnish a visually positive, or active, indication to denote a safe condition of an electrical conductor and a visually negative indication, that is no response whatever, to indicate a dangerous condition.

The phrase "visually positive reaction" or "visually negative reaction", as used in this specification and in the claims is intended to denote the physical action of an element or of the instrument, that is to say, "positive reaction" denotes movement or other action, while "negative reaction" denotes the absence of movement or other action.

Should an instrument, such as that contemplated by the present invention, become out of order, it will, by giving no active response, indicate at all times a dangerous condition of the electrical conductor. Consequently, my device cannot possibly indicate that an energized conductor is safe, and therefore the hazards inherent in prior devices are entirely absent from the indicating instrument of my present invention. From a standpoint of safety, the present device surpasses any heretofore known.

Prior indicating devices, have depended for their operation upon power received from the circuit being tested, and being unable to receive power from a dead conductor, were unable to give a positive response to such a condition.

It is therefore a further object of my present invention to provide an indicating instrument utilizing an independent source of energy with which to produce an active response in the instrument to indicate a dead circuit, and to provide in combination therewith, means to bring the indicator to rest when it is influenced by a live circuit.

The present invention contemplates the provision of an instrument having a rotating element whose motion is restrained whenever the instrument is brought into the influence of an energized electrical conductor. Specifically, I have provided in the disclosed embodiment of my invention, a Crooke's radiometer which rotates in a known manner under the influence of light or other radiant energy, and I have mounted on the rotating part of the radiometer, a pair of targets which are adapted to be held stationary by electrostatic attraction when the instrument is influenced by a live conductor. The rotating parts are mounted in a partially evacuated glass bulb and terminal means for cooperation with the electrostatic targets are positioned externally of the glass bulb to facilitate the making of an electrical connection to the conductor to be tested.

If the conductor is not energized and safe for touch, the system within the bulb will rotate due to the action of the radiometer disks in response to light striking the device. The instrument will indicate by visually positive reaction that the conductor is safe.

However, if the conductor is energized the rotation of the system is impeded and stopped by the electrostatic field created by the energized conductor drawing the electro responsive element in line with the terminals which are connected to the energized conductor, and the instrument will indicate by visually negative reaction that the conductor is energized and unsafe.

If the instrument should be out of working order the indication will be visually negative, exactly as in the last mentioned case with the conductor energized, i. e., it will indicate the most dangerous condition.

Thus, by combining a light or other radiant energy responsive element with an electro responsive element, my invention furnishes a simple and effective device for infallibly indicating electric conditions of a current carrier.

Instead of employing the electrostatic principle as explained above, the electromagnetic principle may be substituted by combining with the rotatable radiometer system a magnetic needle in place of the metal targets. The needle will be aligned by the magnetic field of the conductor under test and will stop the rotation in case of an energized conductor.

The instrument may be permanently attached to a conductor or may be arranged to be placed on a conductor by means of a hook pole. A suitable source of light, such as a flash-light may be arranged to irradiate the instrument and to excite its operation wherever necessary. The light responsive system is naturally more responsive to red light as the energy of radiation is greater. In case of a permanent installation in the absence of daylight or when continuous indication is required, it is advisable to mount a small flash-light having red lenses in the proximity of the instrument for throwing light on the instrument.

The bulb enveloping the system may be partially evacuated or may contain an inert gas, such as argon, neon or krypton.

I shall now explain the invention in detail with reference to the attached single sheet of drawing.

Figure 1 of the drawing illustrates diagrammatically a top view of a radiometer or light responsive element;

Figure 2 shows diagrammatically the top view of an electrostatic element as used in the present invention;

Figure 3 shows a side view of one embodiment of my invention with certain parts shown broken away or in cross-section to facilitate explanation;

Figure 4 illustrates another side view of my invention with certain parts shown broken away, and represents the device shown in Figure 3 turned to view by 90 degrees; and Figure 5 shows a cross-sectional top view of the device as taken on line 5—5 of Figure 3.

For convenience of description, like parts in the Figures 3 to 5, inclusive, have been designated by like reference numerals, and a certain figure will be referred to only if necessary for accurately explaining certain parts.

Referring now to the drawing shown in Figure 1, this drawing represents a radiant energy responsive element, which is enclosed in a partially evacuated vessel designated by numeral 1. Rotatably suspended in this vessel 1 are four disks or targets 2, 3, 4, 5, each attached to a bar or blade such as 6, 7, 8 and 9, respectively. These bars or blades holding the disks are attached to a rotatably mounted rotor 10 which may either be suspended on a quartz string as described, or on a bearing needle within the bulb or vessel 1. One side of each target is blackened, and light striking the element will cause rotation of the targets in the direction of the light side of the target as explained previously.

Figure 2 represents an electrostatic element contained in a vessel 11. Rotatably suspended within the vessel is a rotor member 12, and attached to this member are bars or blades 13 and 14, holding metal disks or targets 15 and 16, respectively. Terminal members 17 and 18 are sealed into the bulb 11 or attached to its outside in some suitable manner.

Assuming now that the metal targets 15 and 16 rotate propelled by some force, and that the terminals are attached to a current conductor, this rotation of the targets will continue without any obstruction as long as there is no current flowing through the conductor. However, if the conductor should be energized, there will be an electrostatic field created and the disks 15 and 16 will line up under the attraction of this field.

Unless this force rotating the targets is greater than the force of the electrostatic field, the rotation will cease and the metal targets will assume the position as shown in the drawing.

Instead of utilizing electrostatic principles as illustrated in Figure 2, electromagnetic principles may be resorted to. The blades or bars 13 and 14 may in such case simply represent the two sides of a rotatably suspended magnetic needle responsive to the magnetic field of a current conductor under which the instrument is placed.

Figures 3 to 5, inclusive, show the combination of two elements acting in accordance with the two different principles as explained above. The electrostatic or the electromagnetic element is combined with a radiant energy responsive element which responds to the radiant energy of light falling upon it to produce a current indicating instrument as contemplated by the present invention. In the embodiment illustrated in Figures 3 to 5, inclusive, I have shown an electrostatic element combined with the energy responsive element. It will be apparent, of course, that this electrostatic element can be replaced by an electromagnetic element if desired.

Referring now to Figures 3, 4 and 5, numeral 19 designates an enveloping glass vessel or bulb. Inside this bulb is a glass seal 20 securely holding a steel bearing needle 21.

Rotatably suspended on this needle is a glass quill 22, having attached to it at its lower end four projecting bars or blades 23, 24, 25 and 26, and carrying at its upper end two bars or blades 27 and 28. The bars or blades may be of aluminum wire attached to the quill 22. The four bars attached to the lower end of the quill carry each a mica target designated by numerals 29, 30, 31 and 32, respectively. One surface of each of these targets is covered with lamp-black. They represent, as mounted on the quill 22, the light responsive or radiant energy responsive element in my invention.

Each of the bars 27 and 28, carries a disk or target 33 and 34, respectively, which may be of aluminum foil. They represent, as mounted on the quill 22, the electroresponsive element of my invention.

Projecting inside the bulb is a tube extension 35 sealed to the bulb, for preventing slipping of the quill 22 out of engagement with the bearing needle 21 when the instrument is accidentally inverted. The bulb is partially evacuated and finally sealed at 36. A protecting globe 37 is sealed to the bulb 19 for protecting the seal 36 against breakage.

Attached to opposite sides of the bulb, or sealed to the bulb, are two terminal members 38 and 39, provided with a wire 40 permanently attached to the terminals. A hook 41 is finally attached to the wire 40 for attaching the instrument to a conductor to be tested, as to a high voltage conductor 42.

The operation, it is believed, will be understood without any further discussion in view of the explanations already given previously.

It will be understood that the instrument may be filled with an inert gas as mentioned, without, by the choice of the gas, departing from the spirit of the disclosure.

It will also be understood that the electrostatic element comprising the bars 27 and 28 and the aluminum targets 33 and 34 may be replaced by a magnetic needle of steel or soft iron, converting the instrument from an electrostatic type into an electromagnetic type. In this case, additional power may be required of the light responsive element to provide against the effect of static voltage which may be an appreciable percentage of the energized voltage under certain conditions. This additional power may be obtained by providing additional mica targets on the rotor 22 if desired. The earth's magnetic field will not be sufficient to align the magnetic needle.

It may likewise be necessary in certain cases to provide a stronger electrostatic field to stop the rotation of the rotatable element effectively. This too may be obtained by adding suitable field targets.

Whenever local conditions require the addition of targets either for the electroresponsive element or for the radiant energy responsive element, it will be best to arrange these targets in sets one above the other.

Summing up the invention in conclusion, it will be seen that I have combined electroresponsive elements and other independently operating elements in a novel manner to produce an indicating instrument which indicates visually by positive reaction a safe or non-energized condition of a current carrier while indicating visually by negative reaction unsafe or energized condition of the current carrier, and also furnishing the latter indication in case the instrument is out of working order or in case of external conditions of such a nature as to prevent its operation (as insufficient light falling on the instrument). There are many advantages resulting from the invention which will be appreciated as a decided advance over the art as known.

It is, of course, possible to modify parts of the instrument or to modify the entire assembly in various ways. I have shown and explained only certain embodiments of the inventive ideas, but I want to have it understood that I am aware of its many possibilities and that I do not intend to apply the invention strictly limited to the physical details as shown and explained, but limited only to the scope of the appended claims in which I have defined what I believe to be new.

I claim as my invention:—

1. Means for indicating the de-energized condition of a power conductor comprising an envelope, radiant energy responsive means rotatably mounted in said envelope and continuously rotated by radiant energy, electrostatic responsive means including an electrode rotatable therewith, and means connected to said power conductor and including an electrode engaging the exterior of said envelope for restraining said electrostatic responsive means upon energization of said conductor.

2. In combination, an envelope, radiant energy responsive means normally tending to rotate within said envelope when exposed to radiant energy, electrostatic responsive means mounted for conjoint rotation therewith and comprising opposed electrodes, correspondingly opposed electrodes mounted in fixed position on the exterior of said envelope, and means for supporting said envelope from a power conductor including means for electrostatically connecting said last named electrodes to said conductor.

3. In a device for indicating the de-energized condition of a power conductor, a radiometer including a rotatable spindle, a plurality of radiant energy responsive discs carried by said spindle and normally tending to rotate said spindle when exposed to radiant energy, a pair of opposed electrodes carried by said spindle and conjointly rotatable therewith, and means disposed exteriorly of said radiometer for supporting said radiometer from a power conductor and having means including a pair of electrodes for electrostatically restraining said electrodes within said radiometer against rotation whenever said conductor is energized.

4. In combination with an electric system, means for indicating the de-energized condition of the system comprising a radiometer with a normal tendency to rotate when exposed to radiant energy, electroresponsive means effective when energized for rendering an impedance to the rotation, and means for connecting the electroresponsive means to the electric system, said radiometer including a sealed envelope, and said electroresponsive means including an electrostatic controlling electrode on the outside of the envelope, and a movable electrode within said radiometer.

5. In combination with a power line, means for indicating the de-energized condition of the line comprising a radiant energy responsive device including a movable member set into continued motion by radiant energy, means for supporting the device from a conductor comprising a continuous conducting member terminating at an electrostatic terminal electrode secured to the body of the device so that the terminal is at the potential of the supporting conductor, said conducting member constituting the sole support of the radiant energy responsive device so that a break in the conducting member that results in an electric separation of the terminal from the conductor must also necessarily result in a loss of support for the device, whereby the fact of support of the device from the conductor is an assurance that the terminal electrode is at the conductor potential, means including an electrode within the device for restraining the movable element, said means being electrostatically coupled with said terminal electrode and effective responsive to the presence of an electric charge thereon, whereby the device can move responsive to radiant energy only when the line is de-energized.

JOSEPH RAH.